United States Patent [19]

Moore

[11] Patent Number: 4,544,244
[45] Date of Patent: Oct. 1, 1985

[54] OPTICAL MICROSCOPE VIEWING HEAD WITH HIGH AND LOW MAGNIFICATION

[75] Inventor: Derek S. Moore, York, England

[73] Assignee: Vickers PLC, London, England

[21] Appl. No.: 591,198

[22] Filed: Mar. 19, 1984

[30] Foreign Application Priority Data

May 26, 1983 [GB] United Kingdom ............... 8314584

[51] Int. Cl.$^4$ .................. G02B 7/04; G02B 7/18; G02B 21/26
[52] U.S. Cl. ................... 350/520; 350/529
[58] Field of Search ............ 350/512, 519–520, 350/529, 535, 570; 356/388, 392–393, 375

[56] References Cited

U.S. PATENT DOCUMENTS

| 3,600,057 | 8/1971 | Leffler | 350/529 |
| 3,851,972 | 12/1974 | Smith et al. | 350/529 |
| 4,061,914 | 12/1977 | Green | 356/39 |

OTHER PUBLICATIONS

Betts et al., "Manual Programmable X-Y Positioner" IBM Tech. Disc. Bull., 2-1976, p. 2863.

*Primary Examiner*—William H. Punter
*Attorney, Agent, or Firm*—Mason, Kolehmainen, Rathburn & Wyss

[57] ABSTRACT

There is disclosed an optical microscope which comprises an adjustable mounting stage on which a specimen can be located, and a viewing head having an eyepiece, and a high magnification viewing system which is focussable on the specimen, after appropriate adjustment of the mounting stage, to enable the specimen to be viewed via the eyepiece. To provide improved positioning of a specimen so that predetermined areas thereof can be more readily located in the field of view of the microscope, the adjustable mounting stage has first and second mounting locations which are spaced apart by a predetermined distance and which serve to mount respectively a first specimen and a second replica or reference specimen, the second specimen bearing at least one predetermined reference point, line, grid, area or the like. The microscope has a viewing head provided with a high magnification viewing system positioned to view the first mounting location and a low magnification system positioned to view the second mounting location. Adjustable optical means is provided on the viewing head which is adjustable between a first position in which the microscope eyepiece can be used to view the first mounting location via the high magnification viewing system and a second position in which the eyepiece can be used to view the second mounting location via the low magnification viewing system.

7 Claims, 7 Drawing Figures

OPTICAL MICROSCOPE VIEWING HEAD WITH HIGH AND LOW MAGNIFICATION

This invention relates to an optical microscope which comprises an adjustable mounting stage on which a specimen can be located, and a viewing head having an eyepiece, and a high magnification viewing system which is focussable on the specimen, after appropriate adjustment of the mounting stage, to enable the specimen to be viewed via the eyepiece.

The present invention has been developed primarily in order to provide an optical microscope having improved positioning of a specimen so that predetermined areas thereof can be more readily located in the field of view of the microscope.

In the routine inspection of silicon wafers, during the manufacture of integrated circuits, it is common practice to examine under high magnification several predetermined dice or chips on each wafer. This inspection is carried out after most of the processing stages to ensure correct registration of the photolithographically produced patterns at the centre and around the periphery of the wafer as well as correct processing across the wafer surface.

The following difficulties are experienced with existing wafer inspection microscopes:

1. Movement of the microscope stage under high magnification commonly gives rise to a form of motion sickness when operators continue to look through the eyepieces during stage traverse in locating the predetermined inspection areas on the wafer. This effect builds up with the extended periods normally spent at wafer inspection microscopes.

2. If operators look away from the microscope eyepieces, in order to directly view the position of the wafer between each inspection area, then the need to refocus the eyes over extended work periods gives rise to eyestrain and headaches.

3. Location of the precise predetermined inspection sites on a wafer is difficult to achieve, particularly as large diameter, dark ground objectives are commonly employed. These objectives conceal from direct viewing the area of the wafer directly under the objective so that operators have to look at an oblique angle under the side of the objective when attempting to position a particular dice under the microscope 4. Wafer inspection microscopes can be fitted with programmamble, microprocessor controlled, motorised stages so that a stage can automatically traverse from one predetermined inspection area to the next upon command. However, this approach is expensive, the stage and its control equipment often being more expensive than the microscope itself. Furthermore, the speed of traverse between areas is normally unacceptably slow due to the use of stepping motors for the stage drive.

According to the invention there is provided an optical microscope which comprises:

an adjustable mounting stage having first and second mounting locations which are spaced apart by a predetermined distance and which serve to mount respectively a first specimen and a second replica or reference specimen, the second specimen bearing at least one predetermined reference point, line, grid, area or the like;

a viewing head having a high magnification viewing system positioned to view the first mounting location and a low magnification system positioned to view the second mounting location;

an eyepiece on the viewing head;

and optical means provided on the viewing head and adjustable between a first position in which the eyepiece can be used to view the first mounting location via the high magnification viewing system and a second position in which the eyepiece can be used to view the second mounting location via the low magnification viewing system.

An optical microscope according to the invention therefore provides for improved positioning of a specimen so that predetermined areas thereof can be more readily located in the field of view of the microscope. Thus, upon inspection of a specimen at the first mounting location, the specimen can be readily adjusted, by appropriate movement of the mounting stage, to enable a different predetermined point or region to be viewed without the necessity for the observer to continue to view the specimen via the high magnification viewing system. When the specimen is to be adjusted to a different position relative to an objective of the microscope, the adjustable optical means is adjusted to the second position in which the observer views the replica or reference specimen at the second mounting location via the low magnification viewing system. The replica or reference specimen, bearing at least one predetermined reference point, line, grid, area or the like, is readily adjusted to a different position by appropriate movement of the mounting stage, and then the optical means is adjusted back to the first position in which the corresponding point or area of the actual specimen has been moved automatically into the field of view of the objective of the microscope, to be viewed by the observer via the eyepiece and the high magnification viewing system.

Accordingly, in use of an optical microscope according to the invention, the disadvantages of the known wafer inspection microscopes listed above can be readily overcome.

The major features of the invention i.e. the mounting stage, the low magnification system and the adjustable optical means may be provided as initial equipment in newly manufactured optical microscopes. Alternatively, the major features of the invention may be applied as modifications to existing microscopes in order to achieve the advantages of the invention, namely more ready locationing of a specimen to permit predetermined points or areas thereof to be viewed.

Conveniently, the low magnification viewing system comprises a separate module which is attached to the viewing head.

The adjustable optical means may take any convenient form to permit the eyepiece effectively to be switched between the optical paths of the high and low magnification viewing systems. In one preferred arrangement, the adjustable optical means comprises a moveable prism assembly. To operate the moveable prism assembly, it is preferred that a manually operable selector be mounted on the viewing head. The selector may comprise a two position selector rod or lever.

It is preferred that the mounting stage includes a locating plate which is provided with the first and second mounting locations, and which may be replaceably mounted on the mounting stage. Different locating plates may be provided to suit operation with different specimens and replica or reference specimens.

When the optical microscope is used in the inspection of semi-conductor components e.g. silicon wafers, the second specimen will preferably comprise a replica specimen provided with predetermined markings which, when viewed through the eyepiece via the low magnification system, will permit ready adjustment of the mounting stage to bring the required point or region of the replica specimen into view whereby the corresponding point or region of the specimen proper will then automatically be available for inspection via the eyepiece and the high magnification system when the adjustable optical means reverts to its first position. Alternatively, a reference (grid-marked) specimen may be used for locating positions on silicon wafers.

When the optical microscope is used in the field of medical and biological sciences for recording the positions of objects of interest in a microscope slide preparation for later detailed examination, the second specimen will comprise a reference specimen provided with "map" grid or other markings.

DESCRIPTION OF THE PREFERRED EMBODIMENT

Figure 1:
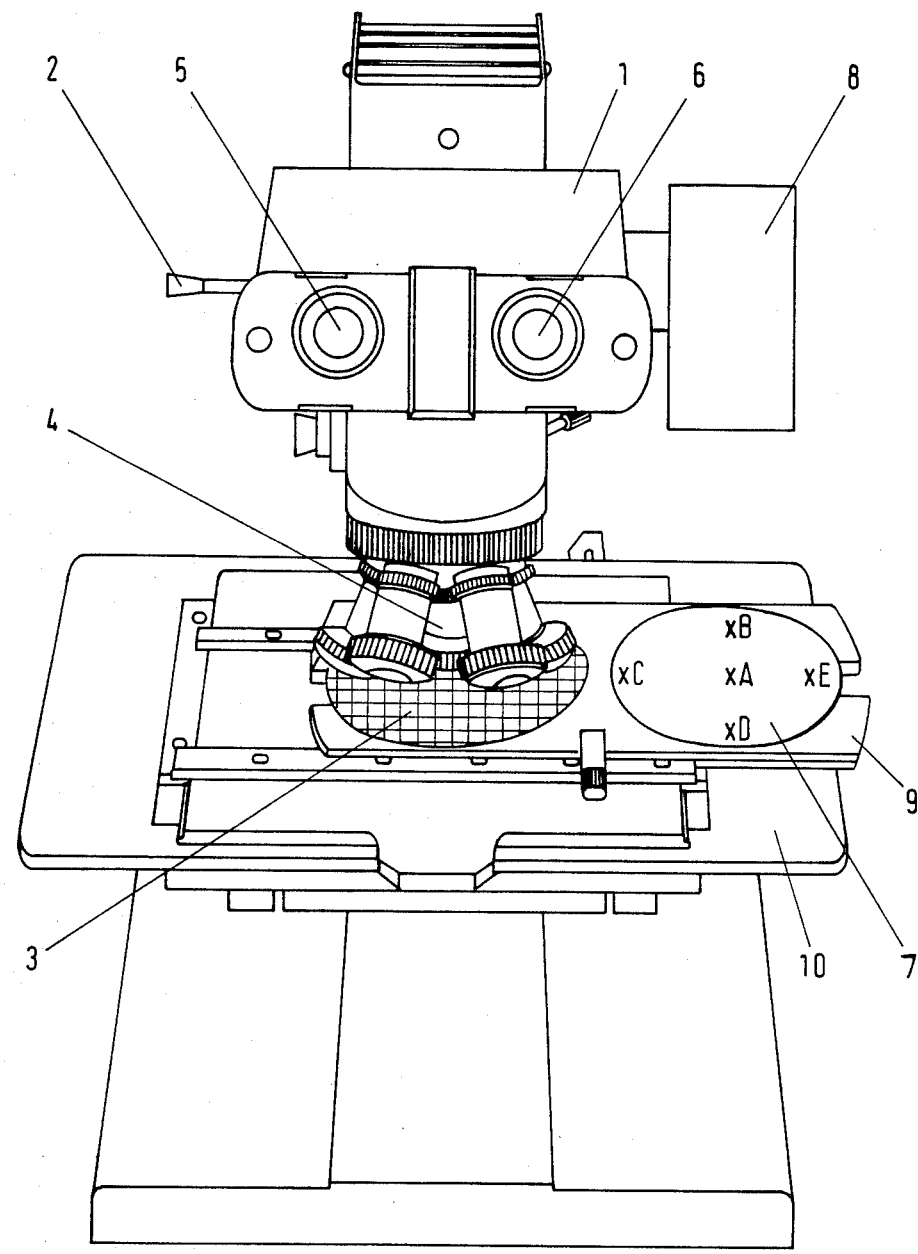
FIG. 1 is a perspective illustration of an optical microscope according to the invention.

Referring now to FIG. 1 of the drawings, there is shown an optical microscope having a viewing head 1 which incorporates a high magnification viewing system (not shown in detail) between a microscope objective 4 and an eyepiece. In the illustrated embodiment, the eyepiece is provided by a pair of eyepieces 5 and 6, though a single eyepiece may be provided if desired.

An adjustable mounting stage 10 carries a replaceably mounted locating plate 9, and provides first and second mounting locations which are spaced apart by a predetermined distance and which serve to mount respectively a first specimen and a second replica or reference specimen. In the illustrated arrangement, the first specimen comprises a semiconductor wafer 3, and the second specimen comprises a replica wafer 7. As shown in the drawing, the replica specimen 7 bears a number of predetermined reference points, though it may bear lines, grids, areas or the like.

The high magnification viewing system of the viewing head is positioned to view the first mounting location (wafer 3), and the viewing head has an attached low magnification viewing system 8 which is positioned to view the second mounting lcoation (replica specimen 7).

Adjustable optical means is provided on the viewing head, taking the form of a moveable prism assembly (shown in FIGS. 2 to 6) which is adjustable between a first position in which the eyepiece (5, 6) can be used to view the first mounting location via the high magnification viewing system and a second position in which the eyepiece can be used to view the second mounting location via the low magnification viewing system. The moveable prism assembly is adjusted by means of a two-position selector rod or lever 2 which projects from the viewing head 1.

When the microscope is used to inspect semiconductor components, the mounting stage 10 is adjusted so as to bring an appropriate one of the marked positions of the replica specimen 7 into the centre of the field of view of the low magnification viewing system (after switching of the eyepiece into the optical path of the low magnification viewing system 8 by operation of the selector rod or lever 2), and then the corresponding inspection site on the specimen proper (wafer 3) will be positioned directly under the microscope objective 4 to be viewed via the high magnification viewing system and the eyepiece when the selector rod or lever 2 reverts from its second position back to its first position.

An observer using the optical microscope can continue looking through the eyepieces throughout the inspection of a complete wafer, without having to observe the wafer through the high magnification viewing system during adjustment of the mounting stage. There will, therefore, be more assurance of the correct areas being examined, less onerous operating conditions for the observer, and a reduced time taken to inspect each wafer, as compared with the known wafer inspection microscopes.

The construction and operation of the adjustable optical means will now be described in more detail with reference to FIGS. 2 to 6. The adjustable part of the optical means comprises a first prism 21 and a second prism 22 which are jointly movable in the direction of the double headed arrows in the Figures under the control of the selector rod 2. The adjustable optical means is shown adjusted to its first position in FIG. 2b, FIG. 5 and FIG. 6, in which the first prism 21 is located in an optical path from the high magnification viewing system of the microscope (provided by the objective 4) and the eyepiece 5, 6.

Figure 3:
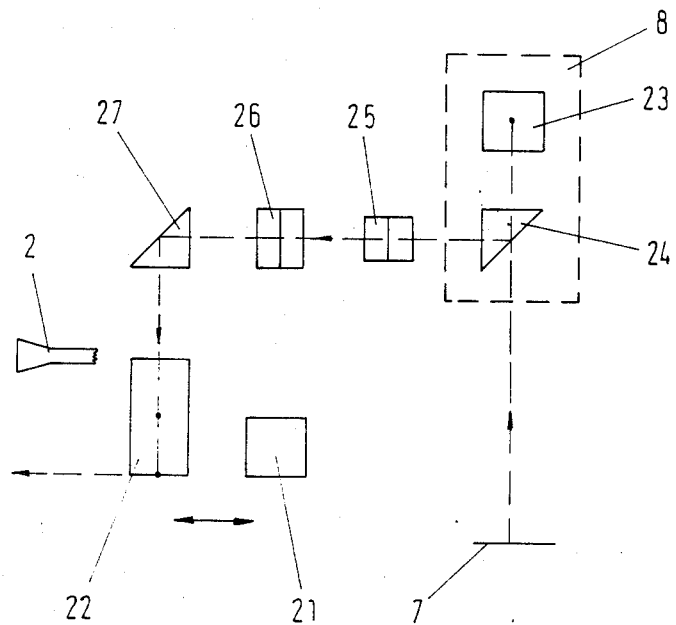
FIG. 3 is a front view, in schematic illustration, of the optical means adjusted to allow viewing via a low magnification viewing system of the microscope.
Figure 4:
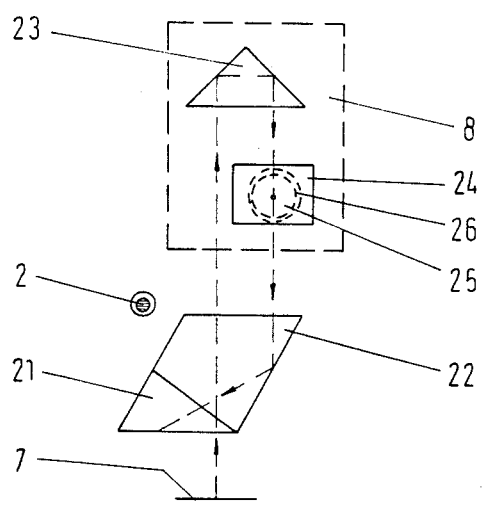
FIG. 4 is a side view of the adjustable optical means, in the adjusted position allowing viewing via the low magnification viewing system.
Figure 5:
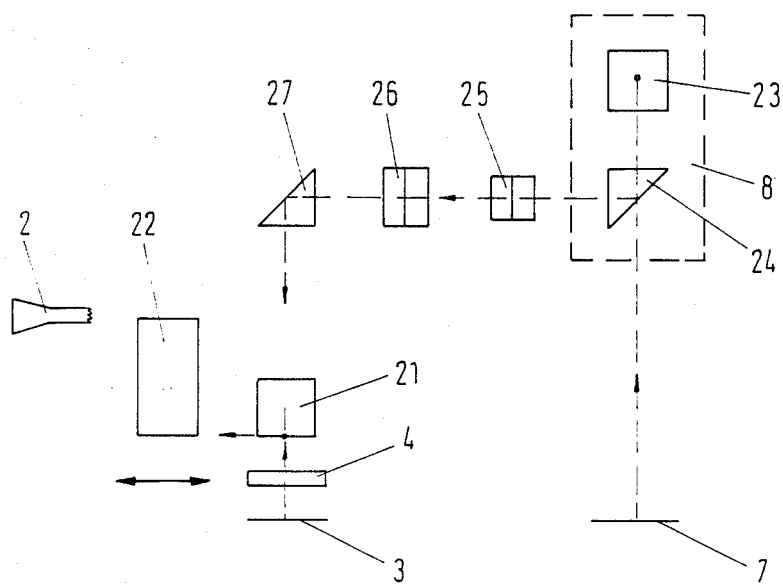
FIG. 5 is a view, similar to FIG. 3, illustrating the optical means adjusted to allow viewing via the high magnification viewing system.
Figure 6:
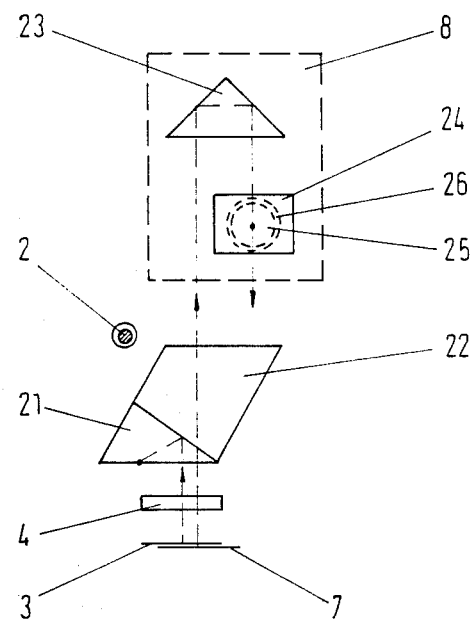
FIG. 6 is a view, similar to FIG. 4, illustrating the optical means adjusted to the position for allowing viewing via the high magnification viewing system.

The adjustable optical means is shown in its second position in FIGS. 2a, 3 and 4, in which the second prism 22 lies on an optical path from the low magnification viewing system (described in more detail below) to the eyepiece 5, 6.

In the first position of the adjustable optical means, the first prism 21 is adjusted by the selector rod 2 so as to lie directly in the path of light from the reference specimen 3 as viewed by the high magnification viewing system (objective 4). The first prism 21 receives light, as shown in FIG. 2b, which is internally reflected within the prism 21 and then emerges to be viewed via the eyepieces 5, 6. When the first prism 21 is in this position, light from the reference or replica specimen 7 may be transmitted via the low magnification viewing system, but it is externally reflected from the facing surface of the prism 21.

The components of the low magnification viewing system, and the optical path from the specimen 7 will now be described.

Figure 2A:
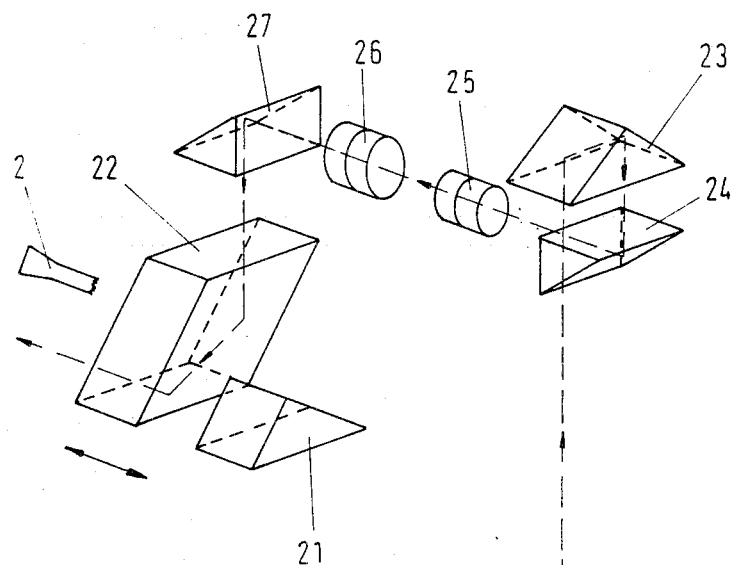
FIG. 2a is an illustration, in isometric view, of one position of an adjustable optical means of the microscope.
Figure 2B:
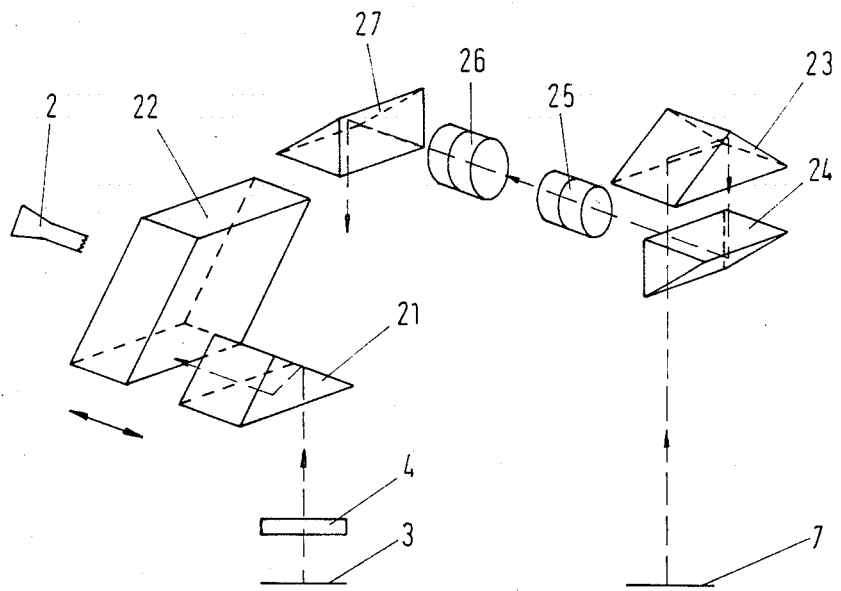
FIG. 2b illustrates a further position taken-up by the adjustable optical means.

Within the attached module 8 (see FIG. 1) there is an arrangement of prisms 23 and 24 which receive light from the specimen 7, as shown in FIG. 2a. Light rays emerging from the prism 24 then pass through a low magnification viewing system provided by a pair of lens systems 25, 26, and then to a reflecting prism 27 which directs the light downwardly towards the second prism 22, which is adjusted by the selector rod 2 to the position shown in FIGS. 2a and 3, to provide a low magnification viewing of the specimen 7 at the eyepiece 5, 6.

As indicated above, the prisms 23 and 24 are housed within the attached module 8, whereas the remaining parts of the adjustable optical means are housed in the viewing head 1.

The optical microscope described and shown herein may also be used in the field of medical and biological sciences, in which case the replica specimen 7 is replaced by a reference specimen bearing predetermined marking which may take the form of a map or grid. The microscope may thus be used to record the position of objects of interest in a microscope slide preparation for later detailed examination.

For instance, during the routine examination of cytological smears for early detection of cancer, technicians may discover anomalous cells requiring study by a consultant in order to establish their nature. With currently available optical microscopes, the method used to record the positions of such cells on a microscope slide is to position the cell of interest in the centre of the field of view and then, without moving the microscope mounting stage, replace the microscope slide with a special glass slide carrying a microscopic grid pattern. This grid pattern is marked with a map reference system so that the grid reference number for the field of view of the cell of interest can be recorded. At a later time, the cell of interest can be re-located by first placing the reference slide under the microscope and moving the microscope mounting stage so that the grid reference number for the field of view of the cell of interest is in view. The reference slide is then exchanged for the specimen slide, when the cell of interest should then be in view. Evidently, this is an awkward procedure, particularly when a high magnification oil immersion objective is being used.

By contrast, using the described embodiment of optical microscope with a reference specimen, the disadvantages of the known method with existing equipment can be readily overcome. Thus, the viewing head of the optical microscope can be readily applied to the recording and re-location of objects of interest in microscope slide preparations. The reference specimen or reference slide will carry a microscopic grid pattern marked with a reference system, which is positioned at a fixed distance to one side of the microscope slide preparation (the first specimen) and on the same moveable mounting stage so that, when a given part of the microscope slide preparation is under the viewing objective, then the corresponding area of the reference slide is in the field of the low magnification viewing system. In this way, the position of an object of interest on the microscope slide preparation can be readily identified and re-located by operating the viewing head selector lever 2 to view the reference slide.

The described embodiment of optical microscope can be manufactured ab initio as original equipment. Alternatively, the major features of the invention i.e. the mounting stage 9, 10, the low magnification system 8 and the adjustable optical means 2 may be provided as modifications to existing microscopes to achieve the advantages of the invention.

Although not shown, if desired means may be provided on the viewing head (1) to permit of lateral adjustment of the low magnification module (8) relative to the viewing head. Means may also be provided on the mounting stage (9, 10) to permit of adjustments of the relative positions of the specimen mounting locations.

I claim:

1. An optical microscope which comprises:
    an adjustable mounting stage having first and second mounting locations which are spaced apart by a predetermined distance and which serve to mount respectively a first specimen and a second replica or reference specimen, the second specimen bearing at least one predetermined reference point, line, grid, area or the like;
    a viewing head having a high magnification viewing system positioned to view the first mounting location and a low magnification system positioned to view the second mounting location;
    an eyepiece on the viewing head;
    and optical means provided on the viewing head and adjustable between a first position in which the eyepiece can be used to view the first mounting location via the high magnification viewing system and a second position in which the eyepiece can be used to view the second mounting location via the low magnification viewing system.

2. An optical microscope according to claim 1, in which the low magnification system comprises a separate module which is attached to the viewing head.

3. An optical microscope according to claim 1, in which the adjustable optical means comprises a movable prism assembly.

4. An optical microscope according to claim 3, in which the movable prism assembly comprises first and second prisms which are jointly movable, the first prism being locatable in an optical path from the high magnification viewing system to the eyepiece in the first position of the adjustable optical means and the second prism being locatable in an optical path from the low magnification viewing system to the eyepiece in the second position of the adjustable optical means.

5. An optical microscope according to claim 3, including a manually operable selector mounted on the viewing head for adjusting the position of the movable prism assembly.

6. An optical microscope according to claim 5, in which the manually operable selector comprises a two position selector rod.

7. An optical microscope according to claim 1, in which the adjustable mounting stage includes a replaceably mounted locating plate which is provided with said first and second mounting locations.

* * * * *